United States Patent [19]

Stiehler

[11] Patent Number: 5,873,008
[45] Date of Patent: Feb. 16, 1999

[54] CAMERA DOOR INTERLOCK MECHANISM

[75] Inventor: Wayne E. Stiehler, Spencerport, N.Y.

[73] Assignee: Eastman Kodak Company, Rochester, N.Y.

[21] Appl. No.: 960,488

[22] Filed: Oct. 29, 1997

[51] Int. Cl.⁶ .................................................. G03B 17/02
[52] U.S. Cl. .......................................... 396/538; 396/536
[58] Field of Search .................................... 396/535, 536, 396/537, 538

[56] References Cited

U.S. PATENT DOCUMENTS

| | | |
|---|---|---|
| 4,572,641 | 2/1986 | Ishihara et al. . |
| 4,676,621 | 6/1987 | Desormeaux . |
| 5,473,401 | 12/1995 | Tsunefuji . |
| 5,481,325 | 1/1996 | Wada et al. . |
| 5,568,217 | 10/1996 | Arai et al. . |
| 5,587,757 | 12/1996 | Seamans et al. . |
| 5,600,393 | 2/1997 | Funahashi . |
| 5,634,165 | 5/1997 | Nakagawa et al. . |

Primary Examiner—Howard B. Blankenship
Attorney, Agent, or Firm—Milton S. Sales

[57] ABSTRACT

A camera film-loading door interlock mechanism includes a film-loading door movable between a closed position and an open position to provide access to a film compartment in the camera. A door latch has an active state retaining the film-loading door in its closed position and an inactive state permitting movement of the film-loading door to its open position. A door un-latching mechanism is movable along a predetermined path to set the door latch in its inactive state, and a locking lever is selectively movable into the path of the door un-latching mechanism to prevent the door un-latching mechanism from setting the door latch in its inactive state. A bi-stable structure selectively moves the locking lever into the path of the door un-latching mechanism. The door un-latching mechanism includes a slide lever, slidably movable along the predetermined path to set the door latch in its inactive state, and a slide lever stop movable with the slide lever. The locking lever is selectively movable into the path of the slide lever stop. The bi-stable structure includes a rotatable cam and an electromagnetic member for selectively rotating the cam to a position causing the locking lever to move into the path of the door un-latching mechanism against a resilient bias.

10 Claims, 6 Drawing Sheets

CAMERA DOOR INTERLOCK MECHANISM

FIELD OF THE INVENTION

This invention relates generally to reloadable photographic cameras, and more specifically to an improved film-loading door interlock device for such cameras.

BACKGROUND OF THE INVENTION

It has long been a desirable feature of current point-and-shoot cameras to prevent accidental opening of the film-loading door while film is present in the film gate. Various mechanisms exist that mechanically sense the presence of film in the film gate and disable the film-loading door un-latching mechanism. Another type of interlock device exists for advanced photo system (APS) cameras wherein the door latch mechanism also interfaces with the film cartridge active-light-lock mechanism. This type of interlock device works by blocking the active-light-lock mechanism unless the cartridge spool is parked in the fully exposed state.

With the advent of the new APS cameras and their sophisticated electronic microprocessor controls, new customer features are being introduced. One such feature is the ability to electronically sense the fully exposed state of a cartridge that has been inserted into the camera. If, for example, a fully exposed cartridge had been inserted into the camera, the camera senses this and does not thrust the film out of the cartridge. To do so would cause double exposure of the film and resultant loss of pictures. Likewise, if a processed cartridge were inserted into the camera, the camera would likely malfunction if it attempted to thrust the film because the metering opto-sensors that are commonly used cannot detect the transitions of the film perforations that are used to register the film in the film gate for each picture.

Another APS feature enhancement is the ability of the camera to sense that a cartridge, being newly inserted into the camera, has been only partially exposed and can now be thrust in a manner that the first available unexposed frame is registered in the film gate. In each of these cases, the camera first drives the film cartridge in the rewind direction in order to optically read a cartridge bar code label and thus determine the state of the cartridge when it was first inserted into the camera. If the camera determines that the cartridge should not be used, as in the case of a fully exposed or processed cartridge, the camera must then re-park the cartridge in its original state. The camera would then provide the user some indication that the cartridge is unusable and that it should be removed from the camera.

During the camera operation cycle where the cartridge bar code label is being read, it is important that nothing interferes with the rotation of the cartridge spool. To do so would cause the bar code label to be mis-read and the exposure state of the cartridge to be incorrectly determined. The undesirable consequences could be double exposed pictures, camera malfunction, or parking the cartridge in the wrong exposure state.

Many of the APS camera features described above would present a challenge to the simple door interlock schemes currently in use. It is apparent then that a more robust and comprehensive door interlock device is required to help prevent the common mishaps that can occur and to help give the user a more enjoyable picture taking experience.

Some cameras use a large solenoid to drive the door latching mechanism or some form of motor driven gear train to provide the necessary power. While these embodiments may be robust, they tend to require substantial space in the camera or require camera power in order to remove the film cartridge at a later time. Noise is another factor that should also be considered.

DISCLOSURE OF THE INVENTION

The present invention presents a solution to the above problem by providing a simple, low cost electromagnetic device that is controlled by the camera microprocessor. The device consists of a simple, bi-stable rotary solenoid that moves a locking lever into and out of disabling engagement with a door unlatching mechanism. Because the device is not required to work against any large load such as a door latch or heavy spring load, it can be made quite small and thus can easily fit into small cameras. A single positive or negative voltage pulse as determined by the logic state of the microprocessor changes the setting of the device from a lock state to an unlock state or vice-versa. Because the device is bistable, no further electric current is required to hold it in a particular state. This allows the camera to be stored long term, for example, with the batteries removed and film left in the camera.

Another advantage of this invention is that the device can still rotate to the unlock state when signaled to do so even though the user may be holding the door latch tight against the locking lever. Because of this feature there is no requirement to provide a feedback device to signal the microprocessor that the interlock device did in fact rotate when signaled to do so.

According to a feature of the present invention, a camera film-loading door interlock mechanism includes a film-loading door movable between a closed position and an open position to provide access to a film compartment in the camera. A door latch has an active state retaining the film-loading door in its closed position and an inactive state permitting movement of the film-loading door to its open position. A door un-latching mechanism is movable along a predetermined path to set the door latch in its inactive state, and a locking lever is selectively movable into the path of the door un-latching mechanism to prevent the door un-latching mechanism from setting the door latch in its inactive state. A bi-stable structure selectively moves the locking lever into the path of the door un-latching mechanism.

According to a preferred embodiment of the present invention, the door un-latching mechanism includes a slide lever, slidably movable along the predetermined path to set the door latch in its inactive state, and a slide lever stop movable with the slide lever. The locking lever is selectively movable into the path of the slide lever stop. The bi-stable structure includes a rotatable cam and an electromagnetic member for selectively rotating the cam to a position causing the locking lever to move into the path of the door un-latching mechanism against a resilient bias.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
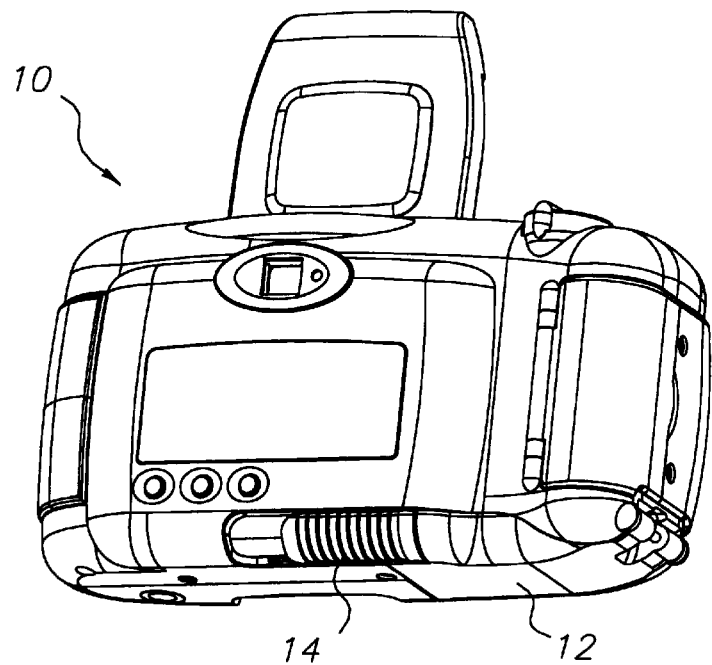
FIG. 1 is a rear perspective view of a camera in which the present invention is useful.
Figure 2:
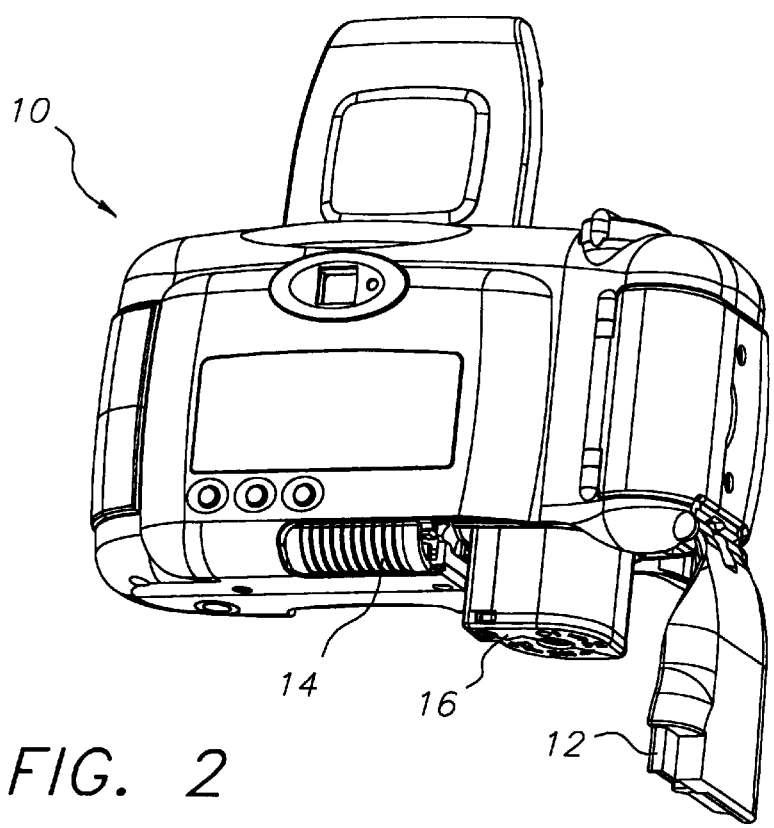
FIG. 2 is a view similar to FIG. 1 illustrating the camera with its film-loading door open and a film cartridge partially inserted.

Referring to FIGS. 1 and 2, an APS camera 10 having a film-loading door 12 movable between a closed position and an open position to provide access to a film compartment in the camera. A door latch 30 has an active state (FIG. 5) retaining the film-loading door in its closed position and an inactive state (FIG. 4) permitting movement of the film-loading door to its open position. A door un-latching mechanism, such as a door slide lever 14, is movable along a predetermined path to set door latch 30 in its inactive state whereby film-loading door 12 is opened so that a film cartridge 16 may be inserted into or removed from the camera. Preferably, film cartridge 16 is a conventional APS cartridge with an active-light-lock door.

Figure 3:
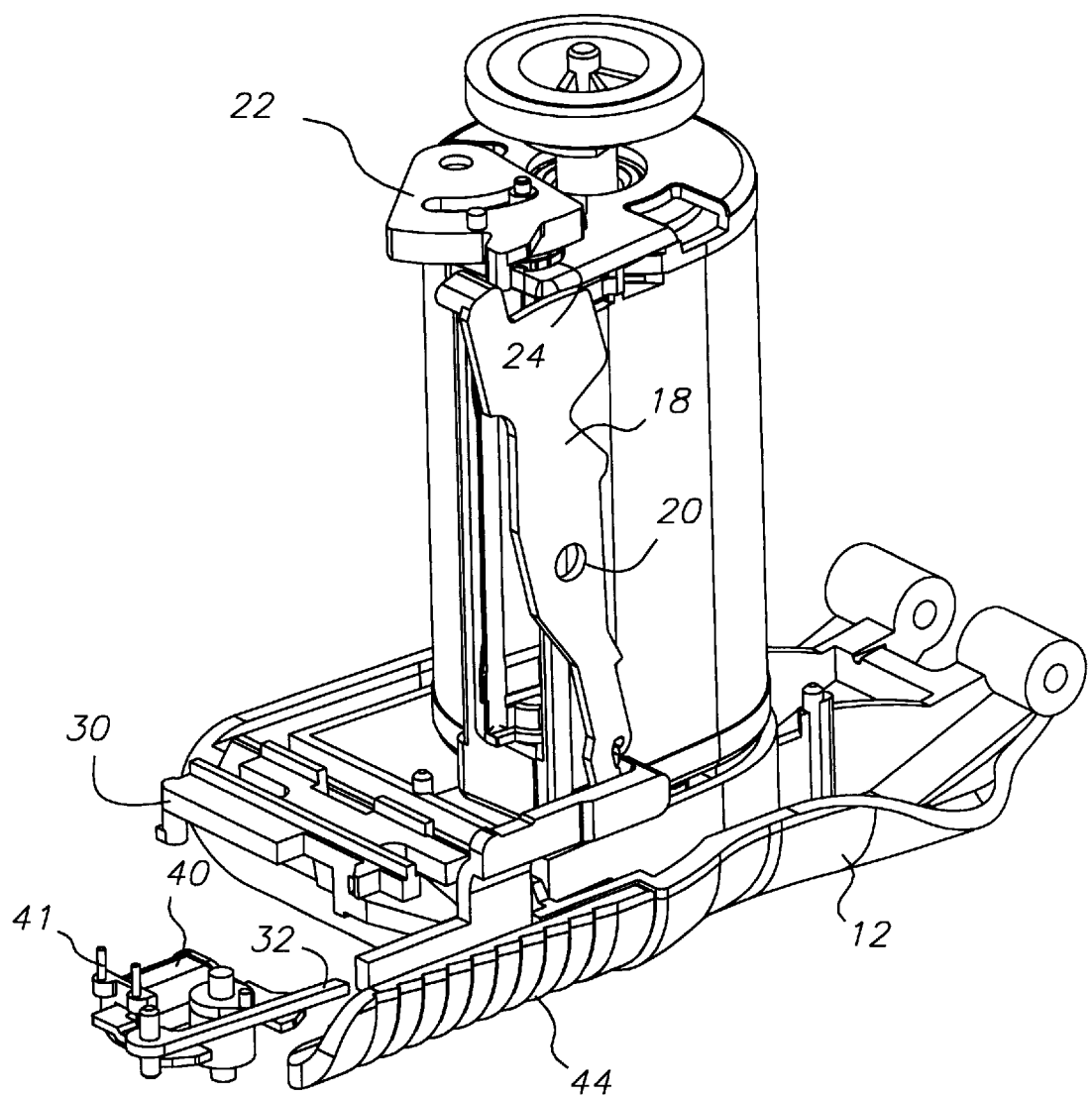
FIG. 3 shows a preferred embodiment of the interlock device as it would be used in an APS camera that incorporates an active-light-lock mechanism that interfaces with the camera door latching mechanism.
Figure 4:
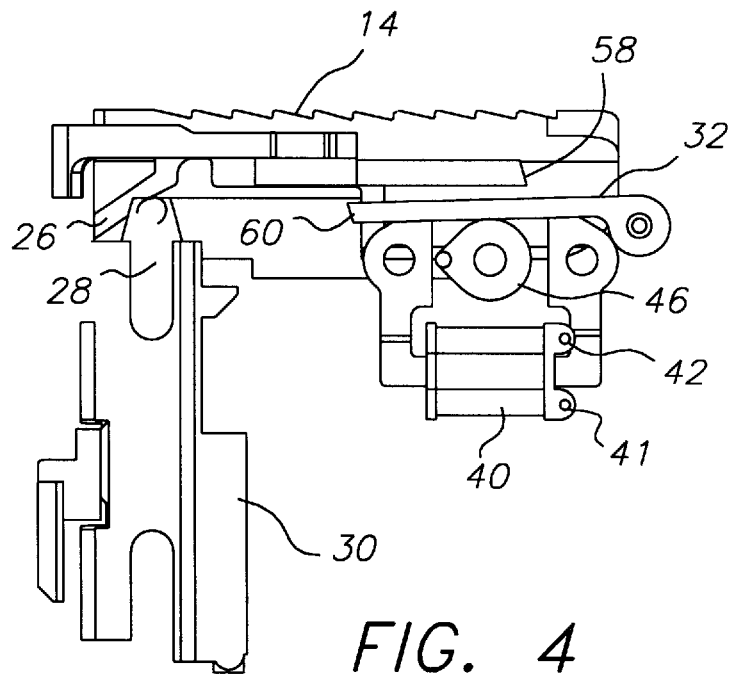
FIG. 4 shows how the door latch mechanism is free to move when the interlock device is in the unlocked state.

Referring now to FIGS. 3 and 4, door slide lever 14 interfaces with an active-light-lock drive lever 18. As the door slide lever is being pulled back, the active-light-lock drive lever rotates about its pivot 20 and contacts an active-light-lock drive sector 22. The active-light-lock drive sector interfaces with an active-light-lock driver 24 which rotates the active-light-lock door of film cartridge 16 (FIGS. 1 and 2) to its CLOSED position. Once the film cartridge active-light-lock door is fully closed, a ramp 26 of door slide lever 14 engages a latch post 28 of door latch 30 and causes it to translate to an UNLATCH position (FIG. 4). Camera film-loading door 12 can now be opened and film cartridge 16 extracted and/or a new cartridge inserted.

Figure 5:
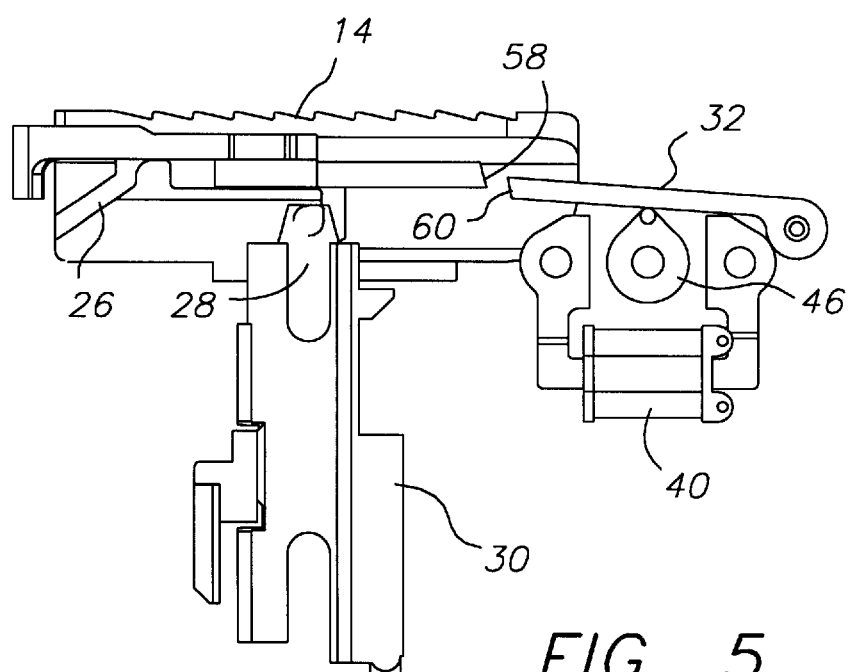
FIG. 5 shows how the interlock device interfaces with the door latch while in the locked state.

Referring to FIG. 5, the interlock device is illustrated in the locked state. A locking lever 32 is movable into and out of the path of a slide lever stop 58 on the door slide lever 14 to prevent the door slide lever from translating in the open direction.

Figure 6:
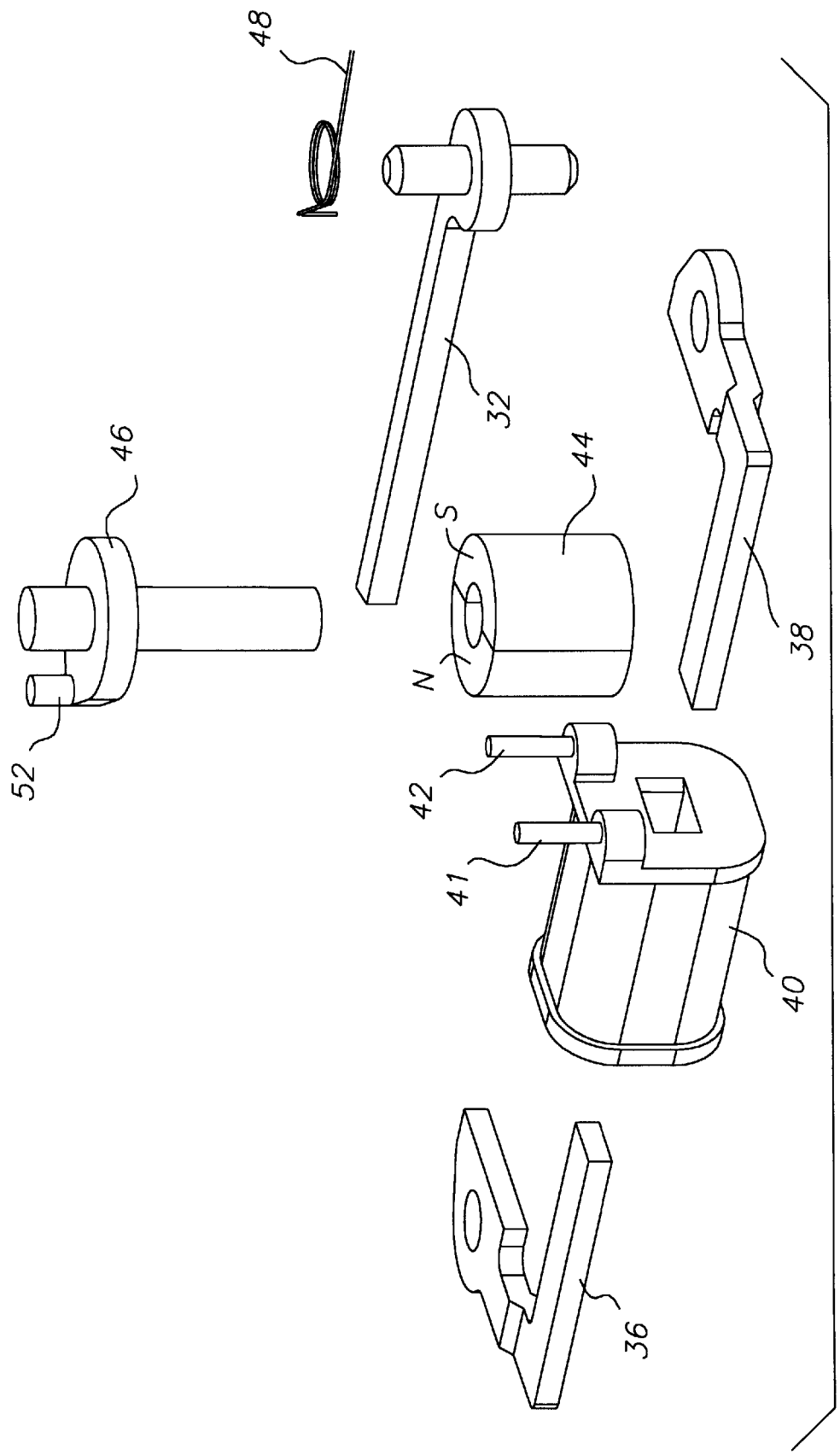
FIG. 6 shows an exploded perspective of the interlock device.
Figure 7:
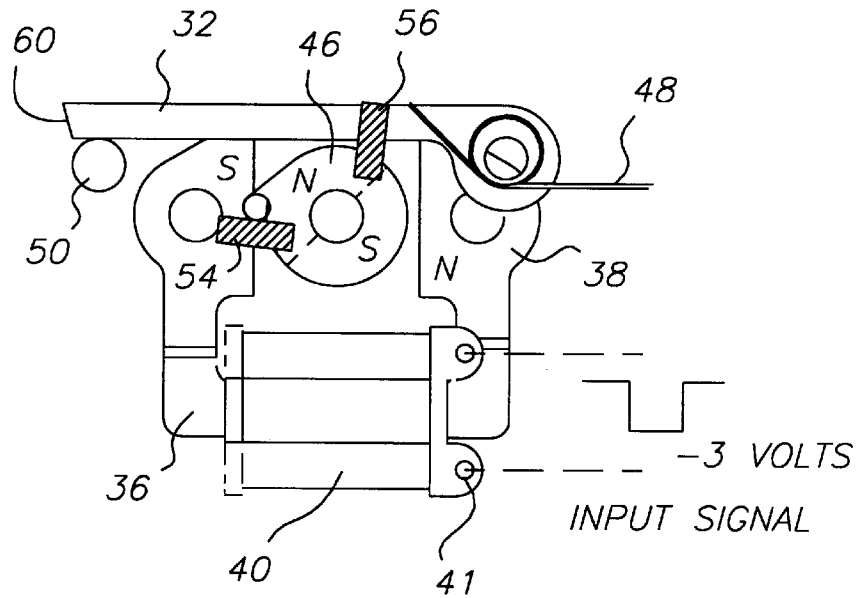
FIG. 7 shows the unlocked state of the interlock device with response to a negative input signal from the microprocessor.
Figure 8:
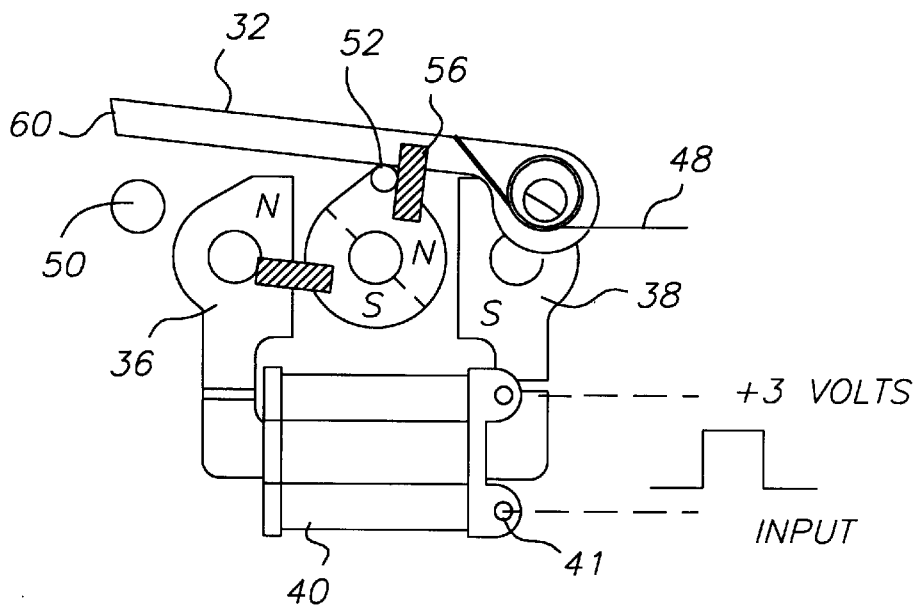
FIG. 8 shows the locked state of the interlock device with response to a positive input signal from the microprocessor.

Referring to FIGS. 6–8, the interlock device is a bi-stable structure which moves locking lever 32 into and out of the path of the door un-latching mechanism. The interlock device includes two magnetic field poles 36 and 38 which are inserted through an electromagnetic coil 40 with electrical terminal connections 41 and 42. An armature assembly includes a permanent magnet armature 44, two magnetic poles "N" and "S" (north and south, respectively) oriented as shown, and a cam 46. The armature assembly is positioned coaxially between magnetic field poles 36 and 38 such that it is free to rotate. Locking lever 32 is rotationally biased about its pivot by a light torsion spring 48 and is limited in the unlocked state by a stop 50, FIG. 7. As cam 46 rotates to the locked position shown in FIG. 8 in response to a positive input signal, the high point of the cam interfaces with locking lever 32, causing the locking lever to rotate and thus to block door slide lever 14, FIG. 5. A stopping post 52 on the end of cam 44 limits the cam's rotation to the zone between two cam rotation stops 54 and 56. While the cam is rotated to either of the two stops, the orientation of the north and south poles of the permanent magnet to the two magnetic field poles 36 and 38 keeps the cam biased against the cam rotation stop because of magnetic attraction of the pole pieces.

Referring again to FIG. 5, a pair of ramped surfaces 58 and 60 of the slide lever stop 34 and the locking lever 32, respectively, provide a safety feature to insure that interlock cam 44 is allowed to rotate freely to the unlocked state even if pressure is being applied to door slide lever 14 in the opening direction before the interlock device has been signaled to unlock. The ramping action of these two surfaces causes locking lever 32 to pull slightly away from cam surface when pressure is applied. Therefore, the cam is free to rotate without any resistance when signaled to do so.

Figure 9:
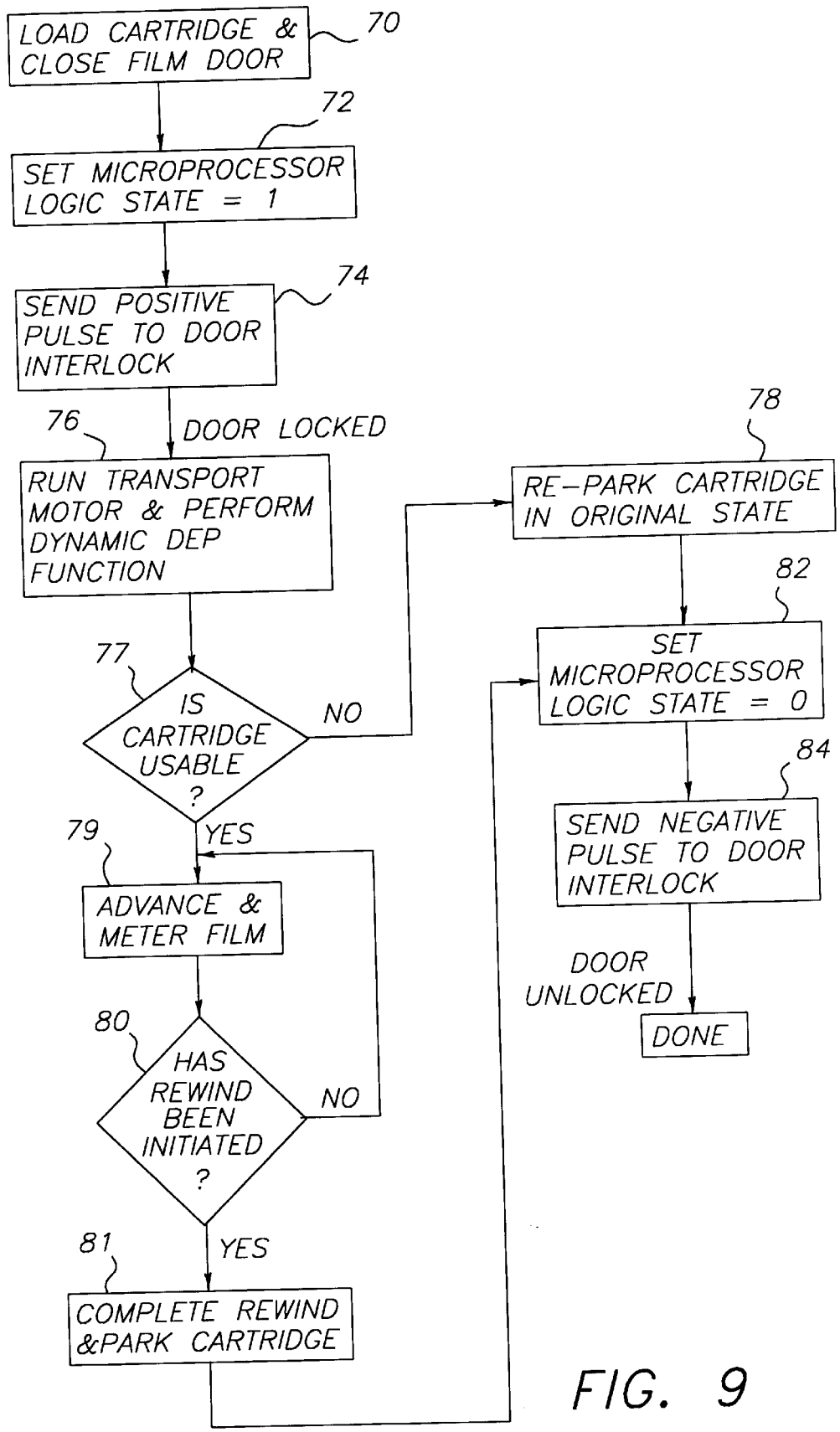
FIG. 9 is a logic flow diagram showing the normal course of camera operation when a cartridge is loaded into the camera.

FIG. 9 is a simplified logic flow diagram that represents the cartridge loading sequence portion of a camera's operation. Upon loading a cartridge 16 into camera 10 and closing film-loading door 12 (Step 70), a signal is received by the camera's microprocessor (not shown) to set the microprocessor to a logic state ONE (Step 72). The microprocessor initiates a positive electrical pulse to the interlock device (Step 74) to lock the film-loading door. At this time, conventional APS cameras will initiate an operational mode, progressing through a series including step 76, wherein the camera dynamically reads the cartridge bar code label and its position when initially loaded in order to verify the usability of the cartridge for the purpose of double exposure prevention (DEP), step 77 to rewind the film if the roll has been totally used (Step 78) or to advance the film to the first un-used frame (Step 79). Once the last frame has been exposed as determined at Step 80, the film is rewound (Step 81).

Now, the microprocessor is reset to a logic state ZERO (Step 82), and the microprocessor initiates a negative electrical pulse to the interlock device (Step 84) to unlock the film-loading door.

The microprocessors used in today's cameras retain their logic state, even when the camera batteries are removed from the camera so that, even when the battery has to be replaced while film is in the camera, the conditions of the camera such as frame number, film ISO, exposure length, etc. are retained. As such, the logic state for the door interlock device would also be retained. If, for example, the interlock device was in the locked state and the logic state of the microprocessor was set to ONE, even repeated pulsing of the interlock coil by the microprocessor would not change the interlock state to unlock it.

The invention has been described in detail with particular reference to preferred embodiments thereof, but it will be understood that variations and modifications can be effected within the spirit and scope of the invention.

What is claimed is:

1. A camera film-loading door interlock mechanism comprising:
   a film-loading door movable between a closed position and an open position to provide access to a film compartment in the camera;
   a door latch having an active state retaining the film-loading door in its closed position and an inactive state permitting movement of the film-loading door to its open position;
   a door un-latching mechanism movable along a predetermined path to set the door latch in its inactive state;
   a locking lever selectively movable into the path of the door un-latching mechanism to prevent the door un-latching mechanism from setting the door latch in its inactive state; and
   a bi-stable structure which selectively moves the locking lever into the path of the door un-latching mechanism.

2. A camera film-loading door interlock mechanism as set forth in claim 1, wherein:
   the door un-latching mechanism includes a slide lever, slidably movable along the predetermined path to set the door latch in its inactive state, and a slide lever stop movable with the slide lever; and
   the locking lever is selectively movable into the path of the slide lever stop.

3. A camera film-loading door interlock mechanism as set forth in claim 1, wherein the locking lever is resiliently biased out of the path of the door un-latching mechanism.

4. A camera film-loading door interlock mechanism as set forth in claim 3, wherein the bi-stable structure includes a rotatable cam and an electromagnetic member for selectively rotating the cam to a position causing the locking lever to move into the path of the door un-latching mechanism against the resilient bias.

5. A camera film-loading door interlock mechanism as set forth in claim 1, wherein the bi-stable structure includes a rotatable electromagnetic armature and a cam, the electromagnetic armature having a first stable state in which the locking lever is in the path of the door un-latching mechanism and a second stable state in which the locking lever is out of the path of the door un-latching mechanism.

6. A camera film-loading door interlock mechanism as set forth in claim 1, wherein:
   the camera includes a microprocessor; and
   the bi-stable structure is actuatable in response to an input signal provided by the microprocessor.

7. A camera film-loading door interlock mechanism as set forth in claim 6, wherein the input signal is a voltage pulse.

8. A camera film-loading door interlock mechanism as set forth in claim 1, wherein the bi-stable structure is a magnetic structure.

9. A camera film-loading door interlock mechanism as set forth in claim 8, wherein the magnetic structure is rotary.

10. A camera film-loading door interlock mechanism as set forth in claim 9, wherein the magnetic structure is a rotary solenoid.

* * * * *